US007151909B2

(12) United States Patent
Nishi et al.

(10) Patent No.: US 7,151,909 B2
(45) Date of Patent: Dec. 19, 2006

(54) BROADCASTING INFORMATION RECEIVING APPARATUS AND BROADCASTING INFORMATION RECEIVING METHOD

(75) Inventors: Hiroyuki Nishi, Tokyo (JP); Fumiyuki Kato, Yokohama (JP); Ryuhei Akiyama, Nishinomiya (JP); Hiroki Maeda, Toyonaka (JP)

(73) Assignees: Matsushita Electric Industrial Co., Ltd., Osaka (JP); Dentsu, Inc., Tokyo (JP)

( * ) Notice: Subject to any disclaimer, the term of this patent is extended or adjusted under 35 U.S.C. 154(b) by 416 days.

(21) Appl. No.: 10/220,594

(22) PCT Filed: Mar. 5, 2001

(86) PCT No.: PCT/JP01/01705

§ 371 (c)(1),
(2), (4) Date: Sep. 3, 2002

(87) PCT Pub. No.: WO01/65744

PCT Pub. Date: Jul. 9, 2001

(65) Prior Publication Data

US 2003/0022621 A1     Jan. 30, 2003

(30) Foreign Application Priority Data

Mar. 3, 2000    (JP)    ............................. 2000-059416

(51) Int. Cl.
*H04H 1/00*    (2006.01)

(52) U.S. Cl. .................. 455/3.01; 455/418; 455/182.1; 455/3.02

(58) Field of Classification Search ............... 455/3.02, 455/3.05, 67.11, 68, 77, 418, 419, 420, 556.2, 455/557, 136, 182.1, 183.1, 186.1, 3.01; 725/40, 46; 703/28, 21; 345/327
See application file for complete search history.

(56) References Cited

U.S. PATENT DOCUMENTS

| | | | | |
|---|---|---|---|---|
| 5,907,322 A | * | 5/1999 | Kelly et al. ................... 725/51 |
| 6,360,195 B1 | * | 3/2002 | Liao et al. .................... 703/28 |
| 6,363,210 B1 | * | 3/2002 | Owashi et al. ................ 705/71 |
| 6,725,461 B1 | * | 4/2004 | Dougherty et al. ........... 725/40 |
| 2002/0129249 A1 | * | 9/2002 | Maillard et al. ............. 713/172 |
| 2004/0052253 A1 | * | 3/2004 | Leermakers ................ 370/390 |

FOREIGN PATENT DOCUMENTS

| | | |
|---|---|---|
| JP | 9-7020 | 1/1997 |
| JP | 10-187267 | 7/1998 |
| JP | 2000-20304 | 1/2000 |

\* cited by examiner

*Primary Examiner*—Edward F. Urban
*Assistant Examiner*—John J. Lee
(74) *Attorney, Agent, or Firm*—Snell & Wilmer L.L.P.

(57) ABSTRACT

A broadcast information receiving apparatus, comprising: a broadcast service receiving section for receiving a plurality of broadcast services from a broadcast information source; and an information transmission section for transmitting information, wherein the broadcast service receiving section includes a general service reception controlling section used for reception of the plurality of general broadcast services, and a specific service reception controlling section used for reception of a specific broadcast service, and the information transmitted by the information transmission section includes at least one of information about the use status of the general service reception controlling section and information about the use status of the specific service reception controlling section.

14 Claims, 5 Drawing Sheets

FIG.2

| | Number of times of use | Time of use (hour) | Use charge (yen) | Payment method |
|---|---|---|---|---|
| General computer program | 30 | 125 | 4,000 | Bank account ID |
| Specific computer program A | 3 | 1.5 | 1,500 | |
| Specific computer program B | 7 | 15 | 45,000 | |
| Specific computer program C | 0 | 0 | 0 | |
| Specific computer program D | 1 | 3 | 1,200 | |
| Specific computer program E | 5 | 2 | 800 | |

BROADCASTING INFORMATION RECEIVING APPARATUS AND BROADCASTING INFORMATION RECEIVING METHOD

TECHNICAL FIELD

The present invention relates to a broadcast information receiving apparatus and broadcast information receiving method for receiving broadcast information.

BACKGROUND ART

When a broadcast service is used through a receiving apparatus, a user is charged for use of the broadcast service. Charging for use of the broadcast service is executed by each broadcast service provider.

However, in the case where charging for use of the broadcast service is executed by each broadcast service provider, a system for executing a charging activity for use of the broadcast service must be established for each broadcast service provider. However, in the case where such a system is established for each broadcast service provider, an entire user system becomes complicated and intricate.

An objective of the present invention is to provide a broadcast information receiving apparatus and broadcast information receiving method which can readily perform charging for use of broadcast services provided by a plurality of broadcast service providers.

DISCLOSURE OF THE INVENTION

A broadcast information receiving apparatus according to the present invention includes: a broadcast service receiving section for receiving a plurality of broadcast services from a broadcast information source; and an information transmission section for transmitting information, wherein the broadcast service receiving section includes a general service reception controlling section used for reception of the plurality of general broadcast services, and a specific service reception controlling section used for reception of a specific broadcast service, and the information transmitted by the information transmission section includes at least one of information about the use status of the general service reception controlling section and information about the use status of the specific service reception controlling section.

The general service reception controlling section and the specific service reception controlling section may have a computer program for controlling the general service reception controlling section and a computer program for controlling the specific service reception controlling section, respectively.

The information may include at least one of information about the use status of the computer program for controlling the general service reception controlling section and information about the use status of the computer program for controlling the specific service reception controlling section.

The broadcast information receiving apparatus may include a control computer program receiving section for receiving from the broadcast information source at least one of the computer program for controlling the general service reception controlling section and the computer program for controlling the specific service reception controlling section; and a control computer program update controlling section for updating a content of at least one of the computer program for controlling the general service reception controlling section and the computer program for controlling the specific service reception controlling section.

The information transmitted by the information transmission section may include information about a charge incurred according to use of at least one of the computer program for controlling the general service reception controlling section and the computer program for controlling the specific service reception controlling section.

The information transmitted by the information transmission section may include information about at least one of a price and a payment method of the charge incurred according to use of at least one of the computer program for controlling the general service reception controlling section and the computer program for controlling the specific service reception controlling section.

A broadcast information receiving method according to the present invention is a receiving method using the receiving apparatus of the present invention, which includes: a first step of receiving a plurality of broadcast services provided from a broadcast information source; and a second step of transmitting at least one of information about the use status of the general service reception controlling section and information about the use status of the specific service reception controlling section.

The general service reception controlling section and the specific service reception controlling section may have a computer program for controlling the general service reception controlling section and a computer program for controlling the specific service reception controlling section, respectively.

The second step may include a third step of transmitting at least one of information about the use status of the computer program for controlling the general service reception controlling section and information about the use status of the computer program for controlling the specific service reception controlling section.

The broadcast information receiving method may further includes: a step of receiving from the broadcast information source at least one of the computer program for controlling the general service reception controlling section and the computer program for controlling the specific service reception controlling section; and a step of updating a content of at least one of the computer program for controlling the general service reception controlling section and the computer program for controlling the specific service reception controlling section.

The third step may include a fourth step of transmitting information about a charge incurred according to use of at least one of the computer program for controlling the general service reception controlling section and the computer program for controlling the specific service reception controlling section.

The fourth step may include a step of transmitting information about at least one of a price and a payment method for the charge incurred according to use of at least one of the computer program for controlling the general service reception controlling section and the computer program for controlling the specific service reception controlling section.

BRIEF DESCRIPTION OF THE DRAWINGS

FIG. 2 shows the relationship between the computer programs used in this example and charges determined according to the use status of the computer programs.

BEST MODE FOR CARRYING OUT THE INVENTION

Figure 1:
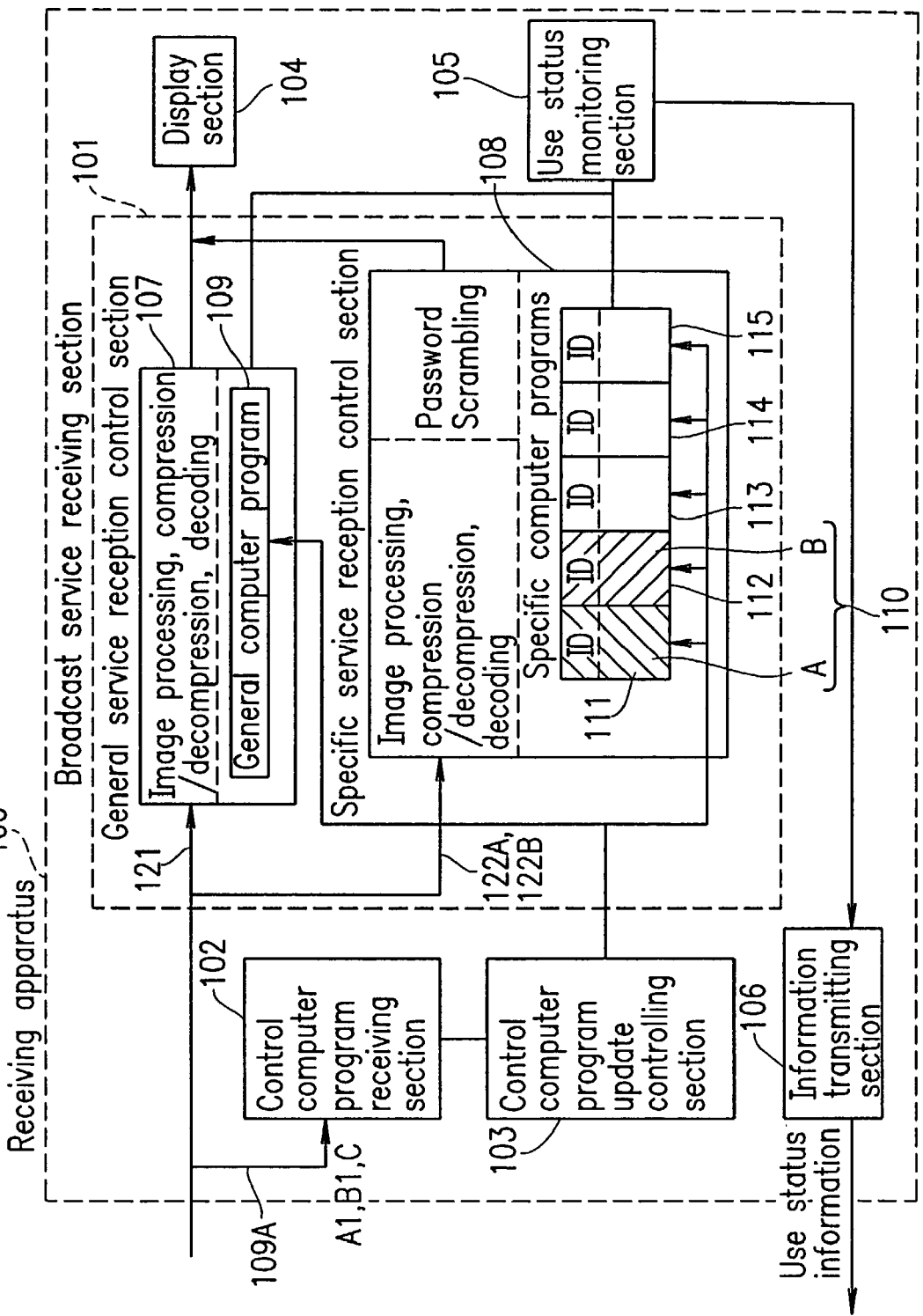
FIG. 1 is a block diagram of a receiving apparatus according to an embodiment of the present invention.

FIG. 1 is a block diagram of a receiving apparatus 100 according to an embodiment of the present invention. The receiving apparatus 100 includes a broadcast service receiving section 101, a control computer program receiving section 102, a control computer program update controlling section 103, a display section 104, a use status monitoring section 105, and an information transmitting section 106.

The broadcast service receiving section 101 includes a general service reception control section 107 and a specific service reception control section 108. The general service reception control section 107 includes a computer program 109 for controlling a general service receiving section. The specific service reception control section 108 includes a computer program 110 for controlling a specific service receiving section.

The broadcast service receiving section 101 receives a plurality of broadcast services provided by broadcast providers. The plurality of broadcast services include general broadcast data 121 which is distributed to general users and a specific broadcast data 122A which is distributed for a specific user.

The general service reception control section 107 receives the general broadcast data 121. The general service reception control section 107 operates based on the general computer program 109. The general service reception control section 107 receives the general broadcast data 121, performs image processing, compression/decompression processing, and decoding processing on an image signal included in the general broadcast data 121, so as to output an image signal 10. The display section 104 displays an image based on the image signal output from the general service reception control section 107.

The specific service reception control section 108 receives specific broadcast data 122. The specific broadcast data 122A includes encrypted information.

The computer program 110 for controlling a specific service receiving section includes a plurality of programs. In the example illustrated in FIG. 1, a program A is stored in a region 111, and a program B is stored in a region 112. Each of the program A and the program B includes an ID.

When the specific service reception control section 108 receives the specific broadcast data 122A, the specific service reception control section 108 operates based on the specific computer program A which corresponds to the specific broadcast data 122A. The specific service reception control section 108 performs image processing, compression/decompression processing, and decoding processing on an image signal included in the specific broadcast data 122A.

The specific service reception control section 108 decrypts information included in the specific broadcast data 122A which was encrypted using a password system or scrambling, so as to output an image signal including the decrypted information. The display section 104 displays an image based on the image signal output from the specific service reception control section 108.

The specific service reception control section 108 can receive a plurality of types of specific broadcast data. When the specific service reception control section 108 receives specific broadcast data 122B, the specific service reception control section 108 operates based on the specific computer program B which corresponds to the specific broadcast data 122B. The specific service reception control section 108 performs image processing, compression/decompression processing, and decoding processing on an image signal included in the specific broadcast data 122B.

The specific service reception control section 108 decrypts information included in the specific broadcast data 122B which was encrypted using a password system or scrambling, so as to output an image signal including the decrypted information. The display section 104 displays an image based on the image signal output from the specific service reception control section 108.

When the control computer program receiving section 102 receives a general computer program 109A, the update controlling section 103 updates the general computer program 109 by the general computer program 109A.

When the control computer program receiving section 102 receives a specific computer program A1, the update controlling section 103 updates the specific computer program A by the specific computer program A1. When the control computer program receiving section 102 receives a specific computer program B1, the update controlling section 103 updates the specific computer program B by the specific computer program B1.

When the control computer program receiving section 102 receives a specific computer program C, the update controlling section 103 stores the specific computer program C in a region 113.

The use status monitoring section 105 monitors the use status of the general computer program 109 and the specific computer program 110.

Figure 3:
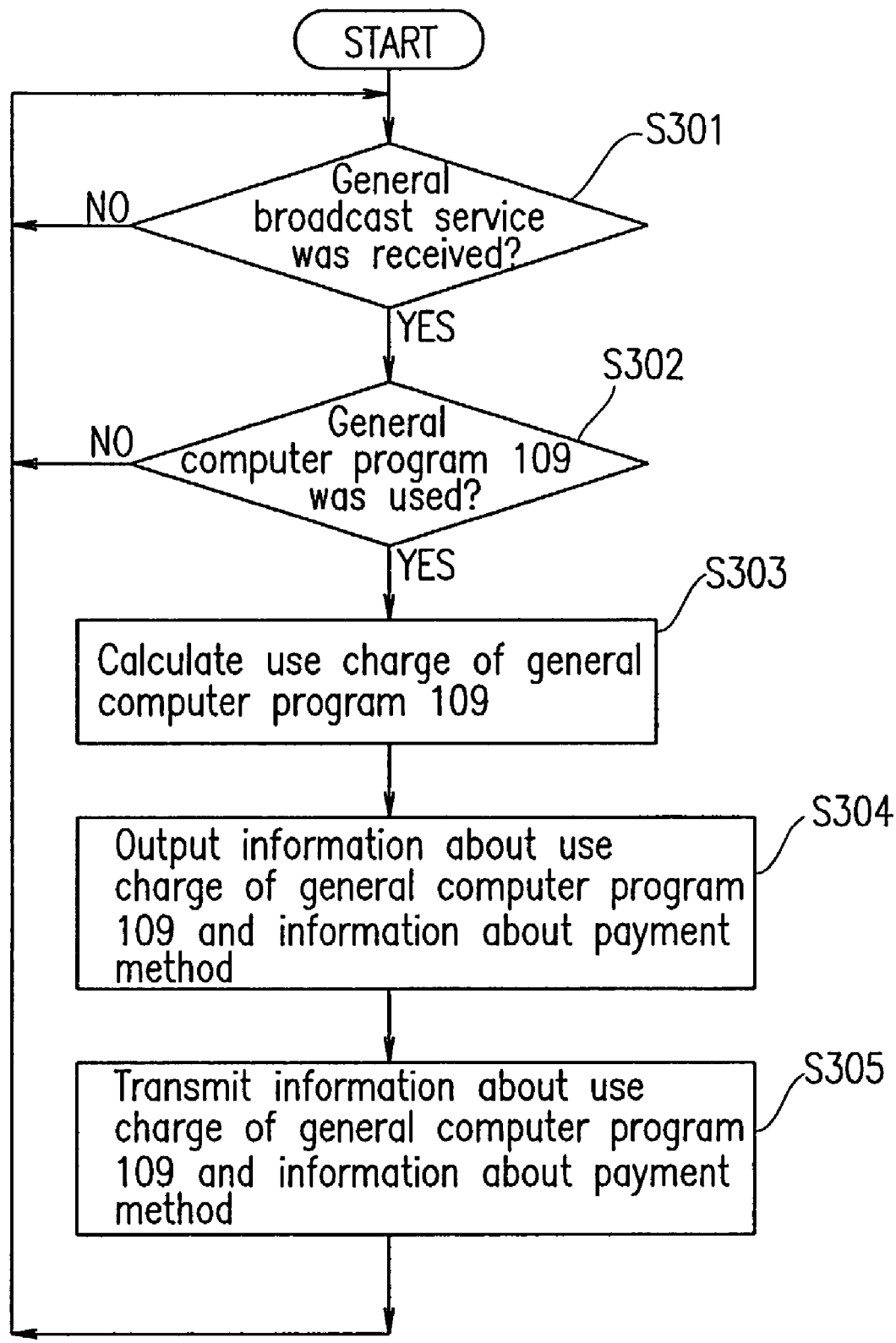
FIG. 3 is a flowchart of a general broadcast service receiving operation of the receiving apparatus 100 according to this embodiment.
Figure 4:
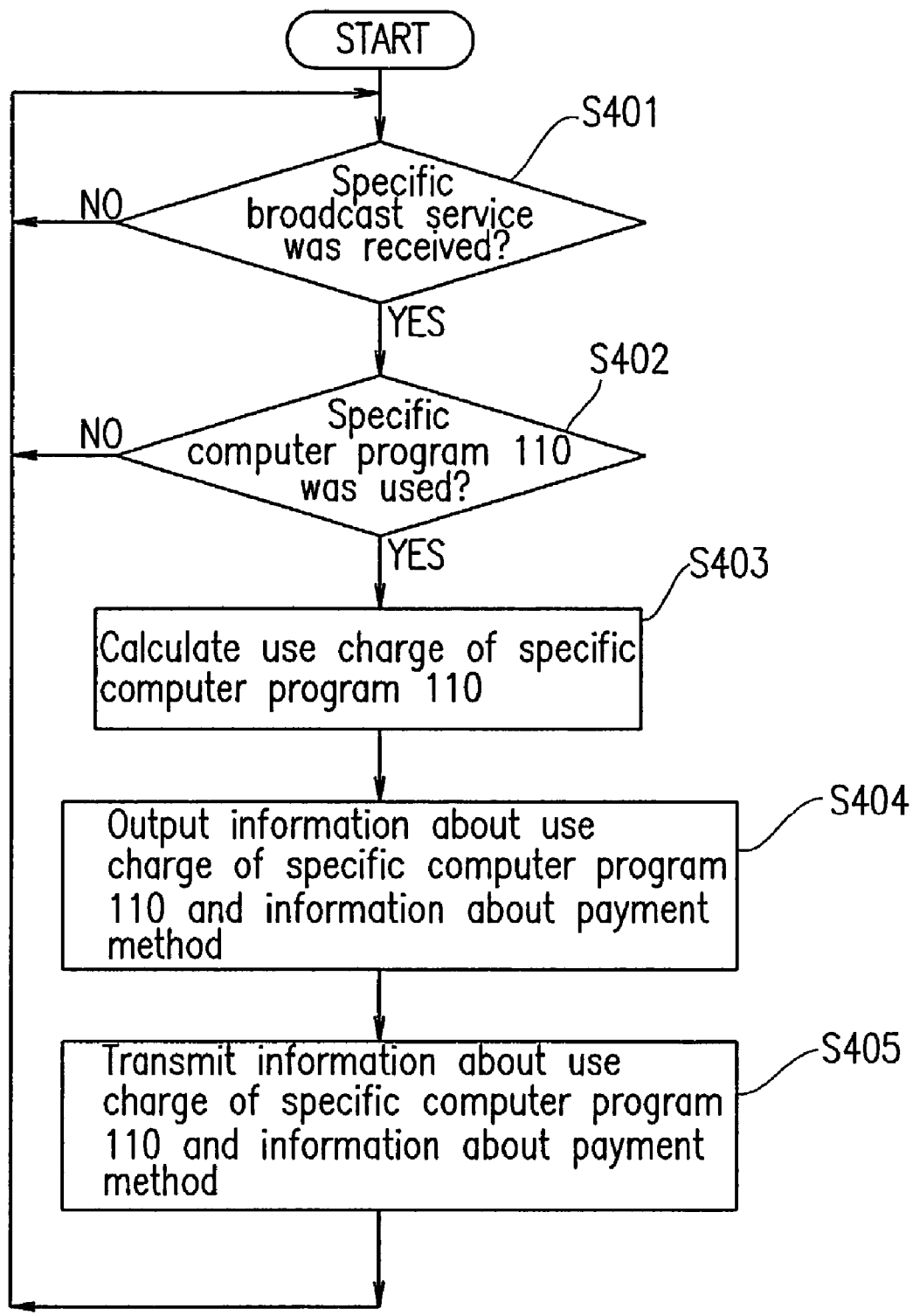
FIG. 4 is a flowchart of a specific broadcast service receiving operation of the receiving apparatus 100 according to this embodiment.

FIG. 2 shows the relationship between the computer programs used in this example and charges determined according to the use status of the computer programs. FIG. 3 is a flowchart of a general broadcast service receiving operation of the receiving apparatus 100 according to this embodiment. FIG. 4 is a flowchart of a specific broadcast service receiving operation of the receiving apparatus 100 according to this embodiment.

The general broadcast service receiving operation of the receiving apparatus 100 is described with reference to FIGS. 2 and 3.

Whether or not the general service reception control section 107 received the general broadcast data 121 is determined (S301). If it is determined that the general service reception control section 107 received the general broadcast data 121 (YES at S301), it is determined whether or not the general computer program 109 was used (S302).

If it is determined that the general computer program 109 was used (YES at S302), the use status monitoring section 105 calculates the use charge of the general computer program 109 (S303).

The use charge is determined based on, for example, the number of times the general computer program 109 was used and the amount of time the general computer program 109 was used. The use status monitoring section 105 calculates the use charge of the general computer program 109 based on the number of times the general computer program 109 was used and the amount of time the general computer program 109 was used.

In the example illustrated in FIG. 2, the number of times the general computer program 109 was used is 30 times, and the amount of time the general computer program 109 was used is 125 hours. Based on the number of times of use, 30 times, and the amount of time of use, 125 hours, the use charge is calculated, for example, at 4,000 yen, according to a certain calculation formula.

The use status monitoring section 105 outputs information about the use charge of the general computer program 109 and information about a payment method for paying the use charge (S304). The information about the use charge includes information about the number of times of use, information about the amount of time of use, and information about the use charge. The information about a payment method is, for example, a bank account ID of a user of the receiving apparatus 100. The information about a payment method may be a credit card ID, or may be information indicating cash payment.

The information transmitting section 106 transmits the information about the use charge of the general computer program 109 and information about a payment method for paying the use charge (S305).

When it is determined that the general service reception control section 107 did not receive the general broadcast data 121 (NO at S301), when it is determined that the general computer program 109 was not used (NO at S302), or when the information transmitting section 106 transmits the information about the use charge of the general computer program 109 and the information about a payment method for paying the use charge (S305), the process returns to step S301.

The specific broadcast service receiving operation of the receiving apparatus 100 is described with reference to FIGS. 2 and 4.

Whether or not the specific service reception control section 108 received the specific broadcast data 122A is determined (S401). If it is determined that the specific service reception control section 108 received the specific broadcast data 122A (YES at S401), it is determined whether or not any of the specific computer programs (specific computer program A or specific computer program B in the example illustrated in FIG. 1) was used (S402).

If it is determined that any of the specific computer programs 110 was used (YES at S402), the use status monitoring section 105 calculates the use charge of the specific computer program 110 (S403).

The use charge is determined based on, for example, the number of times the specific computer program 110 was used and the amount of time the specific computer program 110 was used. The use status monitoring section 105 calculates the use charge of the specific computer program 110 based on the number of times the specific computer program 110 was used and the amount of time the specific computer program 110 was used.

In the example illustrated in FIG. 2, the number of times the specific computer program A was used is 3 times, and the amount of time the specific computer program A was used is 1.5 hours. Based on the number of times of use, 3 times, and the amount of time of use, 1.5 hours, the use charge is calculated, for example, at 1,500 yen, according to a certain calculation formula. The use charge of the specific computer program B is calculated, for example, at 45,000 yen, according to a certain calculation formula, based on the number of times the specific computer program B was used, 7 times, and the amount of time the specific computer program B was used, 15 hours. The use charge of the specific computer program C is calculated, for example, at 0 yen, according to a certain calculation formula, based on the number of times the specific computer program C was used, 0 times, and the amount of time the specific computer program C was used, 0 hours. The use charge of the specific computer program D is calculated, for example, at 1,200 yen, according to a certain calculation formula, based on the number of times the specific computer program D was used, 1 times, and the amount of time the specific computer program D was used, 3 hours. The use charge of the specific computer program E is calculated, for example, at 800 yen, according to a certain calculation formula, based on the number of times the specific computer program E was used, 5 times, and the amount of time the specific computer program E was used, 2 hours.

The use status monitoring section 105 outputs information about the use charge of the specific computer programs 110 and information about a payment method for paying the use charge (S404). The information about the use charge includes information about the number of times of use, information about the amount of time of use, and information about the use charge. The information about a payment method is, for example, a bank account ID of a user of the receiving apparatus 100. The information about a payment method may be a credit card ID, or may be information indicating cash payment.

The information transmitting section 106 transmits the information about the use charge of the specific computer programs 110 and information about a payment method for paying the use charge (S405).

When it is determined that the specific service reception control section 108 did not receive the specific broadcast data 121A (NO at S401), when it is determined that the specific computer program 110 was not used (NO at S402), or when the information transmitting section 106 transmits the information about the use charge of the specific computer program 110 and the information about a payment method for paying the use charge (S405), the process returns to step S401.

As described above, according to this embodiment, the receiving apparatus 100 which can readily perform charging for use of the general computer program 109 and the specific computer program 110 can be provided.

Figure 5:
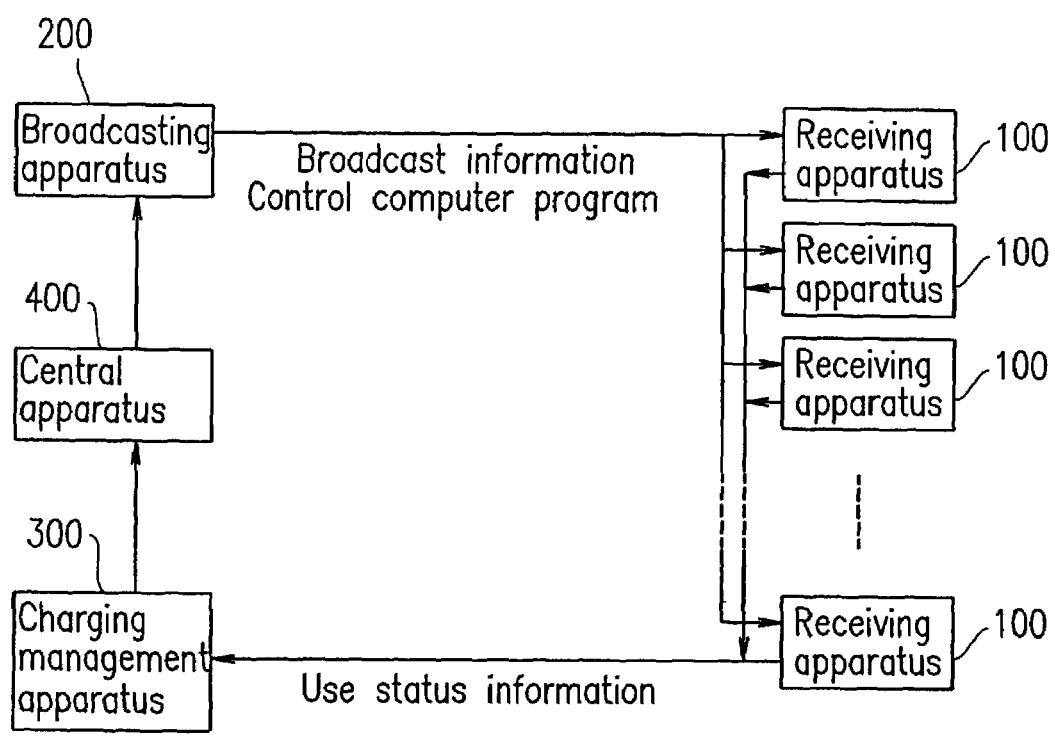
FIG. 5 is a block diagram of a broadcast system including a receiving apparatus of this embodiment.

FIG. 5 is a block diagram of a broadcast system including a receiving apparatus of this embodiment.

The broadcast system includes a plurality of receiving apparatuses 100, a broadcast apparatus 200, a charging management apparatus 300, and a central apparatus 400. The broadcast apparatus 200 transmits broadcast information and a control computer program to the receiving apparatuses 100. The broadcast information includes general broadcast data and specific broadcast data. The control computer program includes a general computer program and specific computer program.

The receiving apparatus 100 receives the broadcast information and the control computer program. The receiving apparatus 100 transmits information about the use charge of the general computer program and the specific computer program and information about a payment method for paying the use charge to the charging management apparatus 300.

The charging management apparatus 300 transmits the information about the use charge of the general computer program and the specific computer program and the information about a payment method for paying the use charge to the central apparatus 400.

The central apparatus 400 transmits the information about the use charge of the general computer program and the specific computer program and the information about a payment method for paying the use charge to the broadcast apparatus 200.

As described above, according to this embodiment, the broadcast system which can distribute to a receiving apparatus broadcast information and a control computer program used for displaying the broadcast information on a display of the receiving apparatus for free, and which can impose a charge on a user of the receiving apparatus according to the use status of the control computer program, can be provided.

INDUSTRIAL APPLICABILITY

As described above, according to the present invention, a broadcast information receiving apparatus and broadcast information receiving method which can readily perform charging for use of broadcast services provided by a plurality of broadcast service providers can be provided.

The invention claimed is:

1. A broadcast information receiving apparatus, comprising:
   a broadcast service receiving section for receiving a plurality of broadcast services from a broadcast information source; and
   an information transmission section for transmitting information,
   wherein the broadcast service receiving section includes
      a general service reception controlling section used for reception of the plurality of general broadcast services and has a computer program for controlling the general service reception controlling section, and
      a specific service reception controlling section used for reception of a specific broadcast service and has a computer program for controlling the specific service reception controlling section, and
   the information transmitted by the information transmission section includes at least one of information about the use status of the general service reception controlling section and information about the use status of the specific service reception controlling section.

2. A broadcast information receiving apparatus according to claim 1, wherein the information includes at least one of information about the use status of the computer program for controlling the general service reception controlling section and information about the use status of the computer program for controlling the specific service reception controlling section.

3. A broadcast information receiving apparatus according to claim 2, wherein the information transmitted by the information transmission section including information about a charge incurred according to use of at least one of the computer program for controlling the general service reception controlling section and the computer program for controlling the specific service reception controlling section.

4. A broadcast information receiving apparatus according to claim 3, wherein the information transmitted by the information transmission section includes information about at least one of a price and a payment method of the charge incurred according to use of at least one of the computer program for controlling the general service reception controlling section and the computer program for controlling the specific service reception controlling section.

5. A broadcast information receiving apparatus according to claim 1, further compromising:
   a control computer program receiving section for receiving from the broadcast information source at least one of the computer program for controlling the general service reception controlling section and the computer program for controlling the specific service reception controlling section; and
   a control computer program update controlling section for updating a content of at least one of the computer program for controlling the general service reception controlling section and the computer program for controlling the specific service reception controlling section.

6. A broadcast information receiving apparatus according to claim 5, wherein the information transmitted by the information transmission section includes information about a charge incurred according to use of at least one of the computer program for controlling the general service reception controlling section and the computer program for controlling the specific service reception controlling section.

7. A broadcast information receiving apparatus according to claim 6, wherein the information transmitted by the information transmission section includes information about at least one of a price and a payment method of the charge incurred according to use of at least one of the computer program for controlling the general service reception controlling section and the computer program for controlling the specific service reception controlling section.

8. A broadcast information receiving method using the receiving apparatus of claim 1, comprising:
   a first step of receiving a plurality of broadcast services provided from a broadcast information source; and
   a second step of transmitting at least one of information about the use status of the general service reception controlling section and information about the use status of the specific service reception controlling section.

9. A broadcast information receiving method according to claim 8, wherein the second step includes a third step of transmitting at least one of information about the use status of the computer program for controlling the general service reception controlling section and information about the use status of the computer program for controlling the specific service reception controlling section.

10. A broadcast information receiving method according to claim 9, wherein the third step includes a fourth step of transmitting information about a charge incurred according to use of at least one of the computer program for controlling the general service reception controlling section and the computer program for controlling the specific service reception controlling section.

11. A broadcast information receiving method according to claim 10, wherein the fourth step includes a step of transmitting information about at least one of a price and a payment method for the charge incurred according to use of at least one of the computer program for controlling the general service reception controlling section and the computer program for controlling the specific service reception controlling section.

12. A broadcast information receiving method according to claim 8, further comprising:
   a step of receiving from the broadcast information source at least one of the computer program for controlling the general service reception controlling section and the computer program for controlling the specific service reception controlling section; and
   a step of updating a content of at least one of the computer program for controlling the general service reception controlling section and the computer program for controlling the specific service reception controlling section.

13. A broadcast information receiving method according to claim 12, wherein the third step includes a fourth step of transmitting information about a charge incurred according to use of at least one of the computer program for controlling the general service reception controlling section and the computer program for controlling the specific service reception controlling section.

14. A broadcast information receiving method according to claim 13, wherein the fourth step includes as step of transmitting information about at least one of a price and a payment method for the charge incurred according to use of at least one of the computer program for controlling the general service reception controlling section and the computer program for controlling the specific service reception controlling section.

* * * * *